Sept. 1, 1931.　　　　E. GRUENFELDT　　　　1,820,971
SHOCK ABSORBER
Filed March 13, 1929　　　2 Sheets-Sheet 1
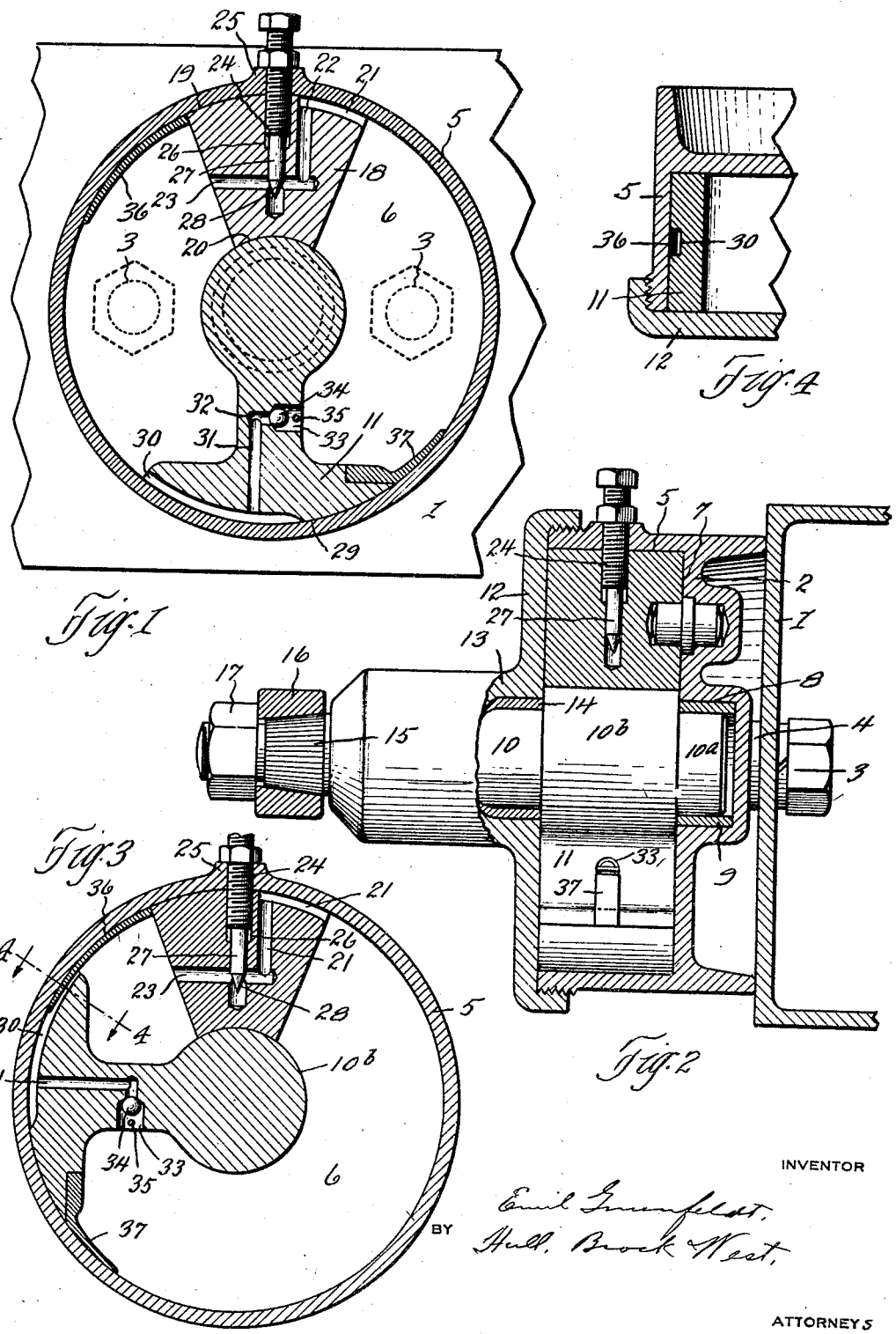

Sept. 1, 1931. E. GRUENFELDT 1,820,971
SHOCK ABSORBER
Filed March 13, 1929 2 Sheets-Sheet 2

INVENTOR
Emil Gruenfeldt,
BY Hull, Brock & West
ATTORNEYS

Patented Sept. 1, 1931

1,820,971

UNITED STATES PATENT OFFICE

EMIL GRUENFELDT, OF CLEVELAND, OHIO

SHOCK ABSORBER

Application filed March 13, 1929. Serial No. 346,510.

This invention relates to shock absorbers of the hydraulic type, and has for its general object to improve the efficiency of devices of this character and particularly in the matter of resisting the movement of a movable abutment toward a fixed abutment.

In constructing shock absorbers of the rotary vane type, the common practice has been to provide such devices with a port or passage of relatively large cross-sectional area for the escape of the liquid as the vane approaches the abutment through the movement of the body and axle toward each other and to provide an adjustable restricted port or passage for the escape of such liquid when the vane is moved in the opposite direction by the separation of the vehicle body and axle.

Under severe blows or impacts of the wheels against obstacles, there is danger that the body and axle may contact and that the vehicle springs may be injured or broken; and, under an excessive force tending to separate the body and axle, there is danger that, notwithstanding the use of a restricted port for the escape of the liquid this movement may attain an amplitude such as to cause damage to the springs and injury to the occupants of the vehicle.

It is the general purpose and object of my invention to provide a shock absorber which, while securing the results accomplished by those commonly in use, will prevent excessive movements of the vehicle body and axle toward and from each other; also to provide a shock absorber wherein such excessive movements are prevented by automatically operating means tending to increasingly throttle the ports through which the liquid must flow.

Figure 5:
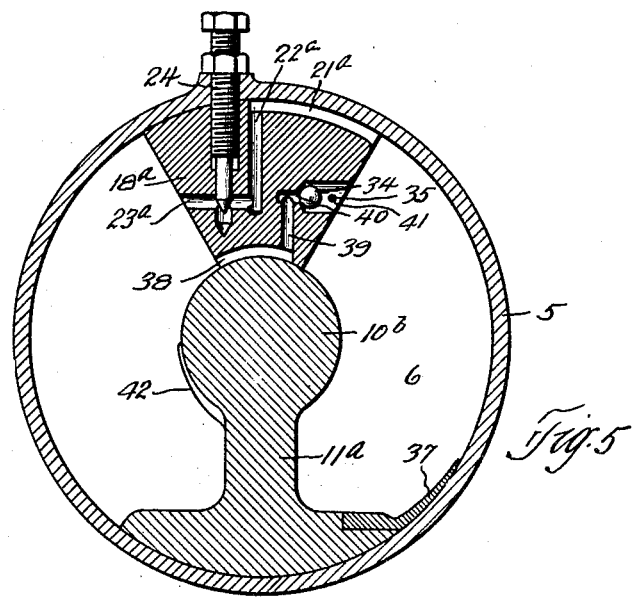
Figure 6:
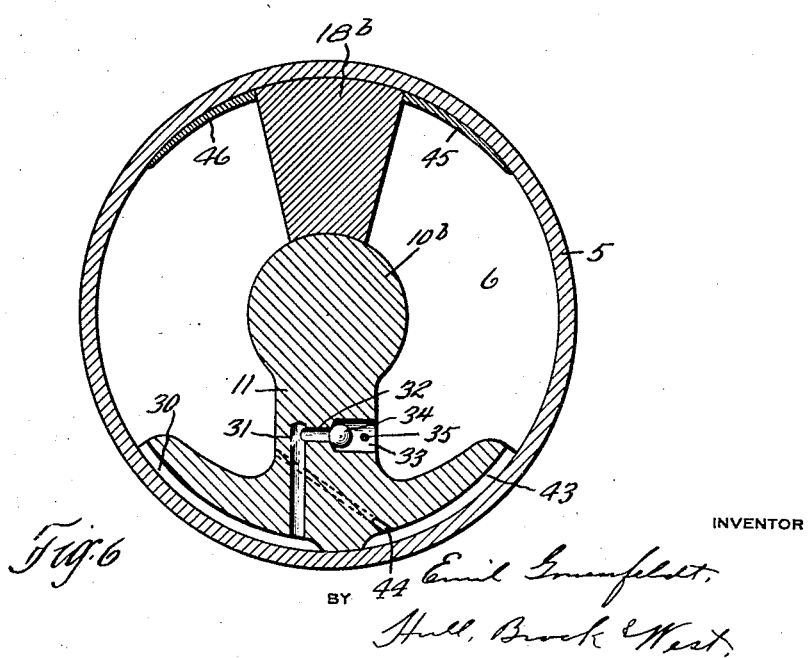

I accomplish the foregoing objects in and through the construction and arrangement of parts shown in the drawings, wherein Fig. 1 represents a transverse sectional view through a shock absorber constructed in accordance with my invention and showing it applied to one of the side members of an automobile, the parts being shown in the positions which they occupy under ordinary or normal running conditions; Fig. 2 a longitudinal sectional view through the shock absorber shown in Fig. 1, certain parts being shown in elevation; Fig. 3 a view similar to Fig. 1, showing the positions of the parts when the vehicle body and axle approach each other unduly; Fig. 4 a detail in section corresponding to the line 4—4 of Fig. 3; and Figs. 5 and 6 are views, similar to Fig. 1, and each showing a modified form of my invention.

Describing the parts herein by reference characters and first in connection with Figs. 1 to 4, inclusive, 1 denotes a side member of an automobile frame, the same being of the ordinary channel construction and having the base 2 of my shock absorber secured thereto by bolts 3, each projecting through the side member and threaded into a boss 4 formed with the said base, the base having a cylindrical flange 5 bearing against the side member. The base 2 is formed as part of a casing 5 having a cylindrical chamber 6 therein, the said chamber extending into the casing from the end opposite the flange 5, the bottom of the chamber being shown at 7. This chamber bottom is shown as provided with a central hollow boss 8 having a bushing 9 therein which receives the inner end $10^a$ of a shaft 10, the said shaft being enlarged within the chamber, as shown at $10^b$, and this enlarged portion being provided with a movable abutment of the vane type, indicated generally at 11.

12 denotes a cover for the outer end of the chamber 6, the said cover being secured to the casing in any convenient manner, as by being threaded thereon. This cover is provided with a central hub 13 provided at its inner end with a bushing 14 for the shaft 10. The outer reduced end of the shaft projects through the outer end of the hub and is provided therebeyond with a frusto-conical portion 15 for the reception of the hub 16 of an operating arm (not shown) which is adapted to be connected to the vehicle axle. The hub is secured in place by means of a nut 17 threaded onto the extreme end of the shaft.

In Fig. 1, the vane 11 is shown in the position which it occupies when riding over a smooth roadway. Diametrically opposed to the vane is a fixed abutment 18, the same being shown as of segmental form having an outer cylindrical surface 19 adapted to engage the cylindrical wall of the chamber 6 and having an inner cylindrical surface 20 adapted to engage the enlarged cylindrical portion 10ᵇ of the shaft. The abutment 18 is provided with a port 21 which is formed in the cylindrical surface 19 and which extends from one side of the abutment to a vertical port 22 the lower end of which in turn communicates with a port 23 extending through the opposite face of the abutment. The effective area of the passage through the abutment, provided by the ports 21, 22, and 23, is varied by means of a needle valve 24, which is threaded into a boss 25 on the casing 5 and which extends into a radial bore 26 in the partition, the reduced inner end 27 of the valve being provided with a needle point 28 which is adapted to close the port 23 more or less, thereby to vary the effective cross-sectional area of said port and of the passage of which it forms a part.

The vane 11 is provided with a wide cylindrical surface 29 engaging the wall of the chamber 6. 30 denotes a port which is formed in such cylindrical surface and which extends from one side of the vane to and beyond a vertical port 31 the inner end of which communicates with a port 32 which in turn communicates with a chamber 33 extending to the opposite side of the vane. A ball check valve 34 is mounted in the chamber 33 and is adapted, when the vane is moved in a counter-clockwise direction, to close the port 32. A cross wire 35 serves as a stop to maintain the ball within the chamber 33.

36 denotes a tapered valve member which extends from one side of the abutment 18 along the wall of the chamber 6 adjacent thereto; and 37 denotes a tapered valve member which is secured to the vane 11 and which slidably engages the wall of the chamber 6.

With the parts constructed and arranged as described, a movement of the movable abutment or vane in a counter-clockwise direction (corresponding to a separating movement between the axle and frame) will force the liquid through the ports 21, 22 and 23, the effective area of the passage thus formed being determined by the valve 24. The more severe the separating movement, the greater will be the resistance to the movement of the vane toward the abutment 18. Under separating movements of ordinary severity and amplitude, the vane will not approach the abutment 18 close enough to cause the valve member 37 to enter the port 21. However, in the event of an extremely severe movement, the valve member 37 will enter such port, and, because of its shape, will increasingly reduce the effective cross-sectional area of the passage for liquid through the abutment and will close such passage entirely before the vane can strike against the abutment.

Movement of the vane in the opposite direction will be resisted by the passage provided by the ports 23, 22 and 21; but a freer flow for the liquid will be afforded through the passage provided by the ports 30, 31 and 32, with the result that but slight resistance will be opposed to ordinary movements of the vehicle axle and body toward each other. In the case of movements of greater force or amplitude, the body and axle will seldom strike; but in case of movements of extreme force and amplitude, as when the wheels encounter large obstacles, there is danger that the body and axle may strike each other, with resulting injury to themselves and to the vehicle springs. I prevent such action by the use of the valve member 36 which, as the vane approaches the side of the abutment from which the said member projects, will enter the port 31 and increasingly cut down the cross-sectional area of the same. Prior to the engagement of the vane with the said abutment, the valve member 36 will have entirely closed the port 30, with the result that the vane and abutment need not contact, it being a mere matter of adjustment to arrange the parts so that the movement of the vane toward the abutment will be stopped before the axle and body can strike.

In Fig. 5 there is shown a modification of the invention wherein both valve members are carried by the vane and the abutment is provided with both sets of ports. In this view, the vane 11ᵃ has no passage therethrough, but is provided with a valve member 37 similar to that with which the vane 11 is provided in the preceding form of my invention. The abutment 18ᵃ in this case is provided with ports 21ᵃ, 22ᵃ and 23ᵃ, corresponding respectively, to the ports 21, 22 and 23 in the preceding form of my invention; and the port 23ᵃ is constricted by a needle valve 24, which is shown as identical in construction with the like designated valve in such preceding form.

The abutment 18ᵃ is also provided with a port 38 extending from one side thereof and formed within the inner cylindrical surface thereof. This port communicates at its inner end with a vertical port 39 which in turn communicates with a transverse port 40, communicating in turn with a chamber 41 extending through the opposite wall of the abutment. In the chamber 41 is a ball check valve 34 retained in said chamber by the cross wire 35.

In this case, the outer cylindrical portion 10ᵇ of the shaft is provided with a tapered valve member 42 which, when the vane moves a sufficient distance in a clockwise direction, will enter and progressively close the port 38.

The operation of the shock absorber shown in Fig. 5, is substantially identical with that shown in the preceding views. Rotation of the vane in a counter-clockwise direction is ordinarily resisted by the liquid forced through the valve controlled passage constituted by the ports 21ª, 22ª and 23ª. Movements of extreme intensity of the vane in the same direction will be further resisted by the valve 37 entering the port 21ª, in the same manner as the valve 37 and port 21 cooperate in the preceding form of my invention.

Movement of the vane 11ª in a clockwise direction will be opposed by the liquid forced through the ports 38, 39 and 40, as well as by the liquid forced through the passage constituted by the ports 23ª, 22ª and 21ª. However, extreme movement of the body toward the axle will be resisted by the valve 42 entering the port 38, and this resistance will be sufficient to prevent the impact of the vane against the partition and the striking of the body and axle.

In Fig. 6 there is shown a still further modification of my invention wherein both passageways are provided in the vane and both valve members are associated with the abutment. In this view, the vane 11ᵇ is provided with the ports 30, 31, 32, chamber 33 and check valve 34 corresponding to the like numbered parts on Figs. 1 and 3. In addition, the vane is provided with a circumferential port 43 extending from the side opposite that having the port 30, the inner end of the port 43 communicating with a restricted port 44 which extends through the opposite side of the vane.

The partition 18ᵇ has no passages therethrough, but has at one side thereof a valve member 45, similar to the valve members 36 and 37 and has at its opposite side a valve member 46, similar to the valve member 36. These valve members operate in the same manner as do the valve members 36 and 37 in the form of my invention shown in Figs. 1 to 4.

Normally, the resistance offered by the shock absorber to separating movements of the vehicle and axle will be determined by the smallest cross-sectional area of the passage provided by the ports 43 and 44. Movements of greater and extreme violence will be further resisted by the entrance of the valve 45 into the port 43, with a further and progressive reduction in the effective cross-sectional area of such port. Movements of the vane in the opposite direction will ordinarily be resisted slightly by the two passages provided through the vane. However, movements of greater force will be resisted by a reduction in the cross-sectional area of the port 30, through the entrance of the valve member 46 thereinto. Before either side of the vane can strike the abutment 18ᵇ, the resistance to the passage of liquid through said vane will be so great as to prevent such impact and will also prevent injury to the springs and body of the vehicle.

Having thus described my invention, what I claim is:

1. A shock absorber comprising, in combination, a casing, a shaft rotatable in said casing, a vane on said shaft, an abutment opposed to said vane and interposed between the shaft and the inner wall of the casing, there being a passage of normally constant cross-sectional area for the flow of liquid due to the movement of the vane toward the abutment in one direction and a passage of variable cross-sectional area opposing the movement of the vane in the opposite direction, and means operated by the approach of the vane toward the abutment in one direction for progressively reducing the cross-sectional area of the first mentioned passage.

2. In a shock absorber, the combination of a casing, a shaft rotatable in said casing, a vane carried by said shaft, an abutment opposed to said vane and interposed between the shaft and the inner wall of the casing, there being a passage of normally constant cross-sectional area permitting the flow of liquid from one of the chambers formed by the abutment and the vane to the other chamber when the vane is moved in one direction, and a passage of variable cross-sectional area for permitting the flow of liquid from the second chamber to the first chamber when the vane moves in the opposite direction, and valve members operated by the approach of the vane to the abutment for increasingly reducing the cross-sectional area of each of said passages.

3. In a liquid shock absorber, the combination of a casing, a shaft rotatable in said casing, a vane carried by the said shaft and extending to the inner wall of said casing, an abutment opposed to said vane and extending from the shaft to the inner wall of said casing, the said vane and abutment dividing the casing into chambers, there being a port of variable cross-sectional area through which liquid is adapted to pass from one chamber to the other as the vane approaches the abutment in one direction and a passage of normally constant cross-sectional area for the passage of liquid from the second chamber to the first chamber when the vane is moved in the opposite direction, the last mentioned passage comprising a port formed in the peripheral portion of the vane and extending from one side thereof, and a tapered valve member on the inner wall of the casing and adjacent to one side of the abutment and adapted to enter the said port as the vane approaches the said abutment.

4. In a shock absorber, the combination of a casing, a shaft rotatable in said casing, a vane carried by said shaft and extending to the inner wall of said casing, an abutment normally angularly spaced from said vane and extending between said shaft and the inner wall of said casing, there being a port for the escape of liquid from the chamber formed between the vane and the abutment as the vane approaches the said abutment, and a valve member arranged to enter the port as the vane approaches the abutment thereby to progressively diminish the cross-sectional area of said port.

5. In a shock-absorber, the combination of a cylindrical casing, a shaft rotatably mounted in said casing, a vane carried by said shaft and extending to the inner wall of said casing, an abutment opposed to said vane and arranged between the said shaft and the inner wall of the casing, there being a passageway through the said vane for placing in communication the chambers formed on opposite sides thereof and there being a passage formed through said abutment adapted to place the said chambers in communication, a valve member adjacent to one side of the abutment and adapted to enter the port in the said vane, and a valve member carried by the said vane and adapted to enter the port in said abutment.

6. In a shock absorber, the combination of a casing, a shaft rotatable in said casing, a vane carried by said shaft and extending to the inner wall of said casing, an abutment opposed to the said vane and extending between the said shaft and the inner wall of the casing, the said vane having a passage therethrough and the said abutment also having a passage therethrough, the latter passage comprising a port formed in the periphery of the said abutment and extending inwardly from one side thereof, a valve member projecting from the side of the vane which cooperates with said abutment and adapted, by the approach of the vane to the abutment, to enter the said port, and additional means for permitting the flow of liquid from one of the chambers in the casing to the other of said chambers when the vane is moved in the opposite direction.

7. A shock absorber including a base of generally cylindrical form exteriorly threaded and having an integral end wall provided with a central boss and an eccentric boss, a bearing sleeve in said central boss, a cover threaded on said base and provided with a central hub portion, a bearing sleeve in said hub, a fixed block caried on the inner concave surface of said base, a shaft journaled in said sleeves and provided with a central enlargement, said enlargement being cylindrical in shape, said block having one face concaved and substantially fitting said enlargement, a vane integral with said shaft and of a thickness at a point adjacent said enlargement less than the largest diameter of said shaft, said vane terminating in a flaring portion having a convex surface substantially fitting the inner concave surface of said base, said vane and said block constituting relatively movable mechanisms, one of said mechanisms having a port therethrough, and a complementary means associated with said vane and block for reducing the size of said port when said mechanisms approach each other, said complementary means including a groove in one of said mechanisms communicating with said port and forming with the inner concave wall of said base a passage, and a projection on the other of said mechanisms, one of said complementary means converging toward its extremity.

In testimony whereof, I hereunto affix my signature.

EMIL GRUENFELDT.